United States Patent [19]
Chen et al.

[11] Patent Number: 5,832,208
[45] Date of Patent: Nov. 3, 1998

[54] ANTI-VIRUS AGENT FOR USE WITH DATABASES AND MAIL SERVERS

[75] Inventors: Chia-Hwang Chen, Plainview; Chih-Ken Luo, Dix Hills, both of N.Y.

[73] Assignee: Cheyenne Software International Sales Corp., Roslyn Heights, N.Y.

[21] Appl. No.: 709,025

[22] Filed: Sep. 5, 1996

[51] Int. Cl.⁶ ..................................................... H04L 9/00
[52] U.S. Cl. ........................ 395/187.01; 395/186; 380/3; 380/4
[58] Field of Search ............................. 395/186, 187.01, 395/183.15, 185.01, 183.04, 183.12, 183.14; 380/4, 3

[56] References Cited

U.S. PATENT DOCUMENTS

| | | | |
|---|---|---|---|
| 5,274,815 | 12/1993 | Trissel et al. | 395/567 |
| 5,319,776 | 6/1994 | Hile et al. | 395/186 |
| 5,414,833 | 5/1995 | Hershey et al. | 395/187.01 |
| 5,440,723 | 8/1995 | Arnold et al. | 395/181 |
| 5,511,163 | 4/1996 | Lerche et al. | 395/183.04 |
| 5,623,600 | 4/1997 | Ji et al. | 395/187.01 |
| 5,649,095 | 7/1997 | Cozza | 395/183.15 |

OTHER PUBLICATIONS

"Introduction to InterScan Virus Wall," 5 pages.
"Anti–Virus", 2 pages.
"Anti–Virus Web Sites (Non–Vendor)", 3 pages.
"Software–Virus," *Nerd World Media*, Jul. 9, 1996, 2 pages.
"4.3 The Antigen Framework", 2 pages.
"5 Antigen Clean", 2 pages.
"ScanMail for cc:Mail—Product Specification," *Trend Micro, Inc.*, 1996, 4 pages.
"E–Mail Virus Wall," *Trend Micro, Inc.*, 1 page.
"InterScan An Introduction," *Trend Micro, Inc.*, Dec. 26, 1995, 3 pages.
"Product Specification—InterScan VirusWall," *Trend Micro Devices, Inc.*, Oct. 25, 1995.

*Primary Examiner*—Ly Hua
*Attorney, Agent, or Firm*—Kenyon & Kenyon

[57] ABSTRACT

A software agent for detecting and removing computer viruses located in attachments to e-mail messages. A client-server computer network includes a server computer and a plurality of client computers. A message system, located at the server computer, controls the distribution of e-mail messages. An anti-virus module, located at the server computer, scans files for viruses. The agent is located at the server computer and provides an interface between the anti-virus module and the message system. The agent can operate both on a real-time basis and at preset period intervals. E-mail messages that are sent internally within the network can be scanned, e.g., Intranet e-mail messages. In addition, e-mail messages received over the Internet can be scanned.

35 Claims, 3 Drawing Sheets

ANTI-VIRUS AGENT FOR USE WITH DATABASES AND MAIL SERVERS

FIELD OF INVENTION

The present invention is directed to a software program and interface to detect and remove computer viruses, and in particular, to a system and method for detecting and removing computer viruses in database file and e-mail attachments.

COPYRIGHT NOTICE

A portion of the disclosure of this patent document contains material which is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

A computer virus is a computer program written to alter, without authorization, the way a computer operates. similar to a biological virus, a computer virus can reproduce itself by attaching to other files.

To be a computer virus, a program need meet only two criteria. First, it is executable, often placing some version of its own code in the path of execution of another program. Often a computer virus executes itself. Second, it replicates itself. For example, a virus program may copy itself to other executable files or to disks that the user accesses. Many computer viruses attach them selves to other executable files.

Viruses are transmitted when an infected file is copied, downloaded or used. Viruses can invade workstations (including desktop computers and laptop computers) and network servers alike.

Many viruses, when executed, cause damage to an infected computer or network server. Some viruses are programmed to damage the computer by corrupting programs, deleting files, or reformatting the hard disk. If a virus does cause damage, the damage will vary depending upon the particular virus infecting the computer. In general, viruses can do the following damage to a computer: hang the computer, erase files, scramble data on the hard disk, attack the File Allocation table, attack the petition table, or format the hard disk.

Other viruses are just nuisances, continually reproducing themselves, or outputting text, video or audio messages. Even these benign viruses, however, can create problems for the computer user because they typically take up computer memory used by legitimate programs. As a result, they often cause erratic behavior and can result in system crashes. In addition, many viruses are bug-ridden, and the bugs may lead to system crashes and data loss.

Personal computer viruses can be classified according to how the virus is transmitted and how it infects the computer. Boot sector viruses infect the system area of a disk—that is, the boot record on floppy diskettes and hard disks. All floppy diskettes and hard disks (including disks containing only data) contain a small program in the boot record that is run when the computer starts up. Boot sector viruses attach themselves to this part of the disk and activate when the user attempts to start up from the infected disk. Accordingly, boot sector viruses overwrite the disk's original boot sector with its own code so that the virus is always loaded into memory before anything else. Once in memory, the virus can make the startup disk unusable or can spread to other disks. Master boot sector viruses overwrite the disk's master boot section (partition table) which is the first sector on the hard disk. File viruses infect other programs when an infected program is run. File viruses must be executed in order to become active. They do not remain in memory, so they do not infect the system. File viruses attach themselves to executable files (such as executable files with extensions such as .COM, .EXE, .OVL, .DLL, .DRV, .SYS, .BIN, and .BAT.) These viruses often change the file attribute information and the file size, time and date information. Memory resident viruses load themselves into memory and take over control of the operating system. Like file viruses, memory resident viruses attach themselves to executable files. Multipartite viruses combine the characteristics of memory resident, file and boot sector viruses.

A recent type of virus, the macro virus, is written in the macro language of a specific computer program, such as a word processor or spreadsheet. Thus, a macro virus can reside in documents. Macro viruses infect files and can become memory resident when executed. They can be run when the program document is accessed or triggered by certain user actions, such as specific keystrokes or menu choices. Macro viruses can be stored in files with any extension and are spread via file transfer, even by e-mail. Although in the past documents have not normally been infected by the previously discussed types of viruses, any application which supports macros that automatically execute is a potential platform for macro viruses. Because documents are now widely shared through networks and over the Internet, even more so than the sharing of diskettes were in the past, document-based viruses are likely to become more prevalent.

Even though the creation of a virus is a deliberate act, viruses are usually introduced into computers and corporate networks inadvertently when innocent users copy or download infected files onto the computer or network.

Traditional anti-virus software is designed to detect and remove computer viruses. Viruses are detected by anti-virus software in two basic ways: through a full scan of a hard drive or in real-time as each file is accessed. Most anti-virus software provide both these features. Additionally, anti-virus programs can be instructed to scan one or more user-selected files or directories of files.

Full and real-time scans detect known viruses using signature codes (like virus fingerprints) which identify a program as a virus. Some anti-virus software also use advanced techniques (such as polymorphic detection) to identify potential viruses and check memory and system files for viruses.

Existing anti-virus products work fine when floppy disks are the main instruments for importing data into a computer's memory. However, in recent years, electronic transfers have become a common way to exchange data in electronic form. Not surprisingly, electronic transfers also have become a major virus threat. Existing anti-virus technology does not safeguard against all possible methods by which viruses can be introduced into and spread within a computer network.

Many corporations have computer networks to allow sharing of programs and data and for exchanging messages. With networking, enterprise computing and intra-organizational communications on the increase, (e.g., using client-server networks and peer-to-peer networks, local area networks and wide area networks) viruses can easily spread throughout the organization's computer system, infecting many computers. And because data exchange is the very reason for using these solutions, a virus on one computer in the enterprise is far more likely to communicate with and infect other computers than would have been true a few years ago. Moreover, many intra-organizational networks have electronic links to external computer networks (such as the Internet, proprietary online services and bulletin boards). Such links enable electronic data and computer programs (including those that may be infected with a computer virus) to be introduced into the organization's network. (According to the National Computer Security Association (NCSA), over 70% of corporate networks are virus infected.) Exposure to virus transmission from network node to node is a costly threat to enterprise data integrity as well as productivity.

Of particular concern in relation to the transmission of computer viruses is electronic mail (e-mail). There is a growing use of e-mail to communicate within an organization (e.g., using a local area network) and to communicate externally (e.g., over the Internet with computer users located at remote locations). E-mail messages may include attached files containing, for example executable programs, formatted documents, sound, video, etc. It will be appreciated that an attachment to an e-mail message may contain a file infected with a computer virus. Thus, for example, an e-mail message received over the Internet may contain as an attachment a Microsoft Word document infected with a Word Macro virus; an e-mail message broadcast on the local area network by a project manager to her many team members may contain an attachment also infected with a virus.

Because any type of file may be attached to an e-mail message, it is often difficult for virus protection software to determine how to handle the attachment. Further, typical e-mail systems store all e-mail messages on a mail server in proprietary file formats, regardless of the format of the attached file. All messages received by one user may be stored as a single file, e.g. "inbox.msg", on a central mail server. Moreover, some e-mail programs use proprietary encryption. It is said that scanning e-mail attachments from inside a LAN is very difficult because e-mail programs like cc:mail, Microsoft Exchange and Davinci encrypt e-mail for privacy reasons. Thus, the formats, algorithms and data structures used by e-mail programs make it difficult to develop anti-virus programs that prevent the spread of viruses in e-mail attachments.

It is an important goal of anti-virus programs to detect a virus as soon as possible, before damage is done or the virus is distributed to infect other computers. Many virus detection programs, for example, do not scan outgoing e-mail messages for viruses, thus allowing the potential spread of a virus to other computers. Commonly used anti-virus program do not scan draft e-mail messages that are created but not sent (i.e., an e-mail message created and stored for later editing and/or sending). Virus detection software directed to e-mail may only scan certain e-mail attachments on the happening of certain determined events. Thus, there is a need to detect viruses at any and every time a virus possibly may enter or spread within an e-mail system.

Several products claim to scan for viruses in attached e-mail files. For example, "ScanMail for cc:Mail" distributed by Trend Micro Incorporated, can scan e-mail attachments received over the Internet. This program is a proxy type software that replaces the original post office with its own proxy post office (where virus checking takes place) and routes clean e-mail to the original e-mail post office after virus checking. Thus, e-mails received from outside the network are first scanned prior to entry into the system post office. (ScanMail is said to protect an internal LAN by intercepting and isolating viruses at the cc:Mail Post Office before the virus reaches a workstation.) However, this architecture does not enable the scanning of Intranet e-mail messages. Messages that are sent and received internally never reach the proxy post office and so are never scanned. Accordingly, users may transmit viruses via e-mail internally within the organization. ScanMail is incapable of detecting viruses in e-mail attachments that originate within and stay within a LAN.

Another product that purports to scan for attachments to e-mail is InterScan VirusWall distributed by Trend Micro Devices, Inc. When installed on a UNIX Internet gateway, InterScan Virus Wall is intended to intercept and scan e-mail attachments, FTP transfers, World Wide Web downloads and uploads and transfers of data between in-house PCS or LANs and the outside world. InterScan VirusWall consists of an FTP proxy server for gateway traffic and a Simple Mail Transfer Protocol (SMTP) proxy server for e-mail. As with the ScanMail application, the InterScan VirusWall program is only capable of scanning e-mail attachments that pass through the Internet gateway; it is incapable of scanning e-mail attachments that are being transferred internally within the LAN. Furthermore, since the InterScan application runs on the gateway and scans individual packets, it may not be sufficiently efficient to detect polymorphic viruses or compressed files if the files are larger then one packet size on the network.

A product called Antigen distributed by Sybari transfers e-mail attachments to a third party virus scanner for detection of virus. However, Antigen is incapable of reattaching the e-mail attachment back to the e-mail message if a virus is discovered and cured. Although the Antigen software will provide the third party software with the e-mail attachment, the attachment inside the system will remain infected because there is no integration between the Antigen software and the third party software to enable the third party software to cure the virus in the e-mail attachment.

Some virus detection programs for e-mail programs operate on the client side and scan e-mail messages sent to a user whenever the user opens his or her mailbox. Such a system has a number of inefficiencies. The virus detection program must be loaded onto each client computer; thus if there are 250 workstations, the virus detection program must be loaded 250 times. If one workstation is missed, a virus may not be detected. Further, the scanning takes place on a deferred basis when the user opens his or her mailbox. If the user is an infrequent e-mail user, then many messages may need to be scanned on opening of the mailbox. Infected e-mail messages may reside undetected for long periods in unopened mailboxes, and possibly be spread to other users by means of automated rules that automatically forward received e-mail meeting certain characteristics.

Accordingly, there is a need for a computer program that can scan and remove computer viruses in e-mail attachments, without causing detriment to the attachment to the e-mail message, for all e-mail messages, including e-mail messages that are internal within the system (e.g., between users on the same mail server), that are sent over or received from an external e-mail system, or are drafted and stored in the e-mail server but are never sent.

There is an additional need for a centralized system for scanning e-mail messages for viruses that does not require anti-virus software to be loaded on all workstations in a network.

SUMMARY OF THE INVENTION

In the representative embodiment, the present invention is a software program (called herein the agent) used in conjunction with anti-virus software to detect and remove computer virus that may be in e-mail attachments.

The agent computer program of the present invention detaches the e-mail attachment from the e-mail message, causes it to be scanned for computer viruses (and if required, causes any detected computer viruses to be removed), and then reattaches the attachment back to the e-mail message. The present invention operates correctly for all e-mail messages, including (a) e-mail messages that are internal within the system (called herein Intranet e-mail), (b) e-mail messages that are sent over or received from an external e-mail system (called herein Internet e-mail), and (c) e-mail messages that are drafted and/or stored in the e-mail system and are yet to be sent.

It will be appreciated that the agent of the present invention operates from within the mail system, rather than as a firewall or proxy post office, enabling Intranet e-mail attachments to be scanned.

Accordingly, the present invention will ensure that all e-mail messages will be scanned to protect the internal e-mail system.

Moreover, once a virus is detected and removed from the attachment, the attachment is still a useful part of the e-mail message and can be handled by the e-mail system as normal.

Advantageously, the present invention operates on the server side rather than at the client side. Thus, the agent need only be loaded once, at each mail server, rather than on each workstation or PC of the network. Further, e-mail messages can be scanned and disinfected regardless of the user's e-mail use. Thus, if the user is on vacation and receives many e-mail messages, some infected with viruses, these will be scanned and disinfected so that upon the user's return, his or her mailbox will contain only virus-free e-mail messages.

The efficiency of such an approach can be seen when analogizing with real world mail delivery. If one wished to scan all letters that are mailed for bombs, it is more efficient to have a scanning machine at the central mail exchange that continuously scans all letters as they are sorted, rather than having a scanning machine at each person's home that scans once a day after the letters are delivered.

In the representative embodiment, the agent browses through any attachments to e-mail messages that originate within the client network or are received from an external network, detaches any such attachments from the database or mailbox, and sends these attachments to an integrated or stand alone anti-virus application. The agent can reattach the attachment to the e-mail message after treatment by the anti-virus application.

Additionally, the agent of the present invention can operate at the server level, thus centralizing virus detection operations. E-mail for a user can be scanned for viruses without the need for the user to login to the network. Further, the scanning of e-mail attachments can take place on a regular, periodic basis, rather than merely upon the sending, receiving or reading of the e-mail message.

The present invention provides an application program interface that can be centrally administered from a network server and that need not be installed at every workstation connected to the centrally administered server.

The agent of the representative embodiment is designed to be generic to and compatible with many e-mail and database systems.

In addition to scanning on a periodic basis, the present invention includes real-time scanning capabilities that will scan e-mail attachments for viruses upon receipt of a new e-mail message.

These and other advantages and features of the present invention will become readily apparent to those skilled in the art after reading the following detailed description of the invention and studying the accompanying drawings.

DETAILED DESCRIPTION

Figure 1:
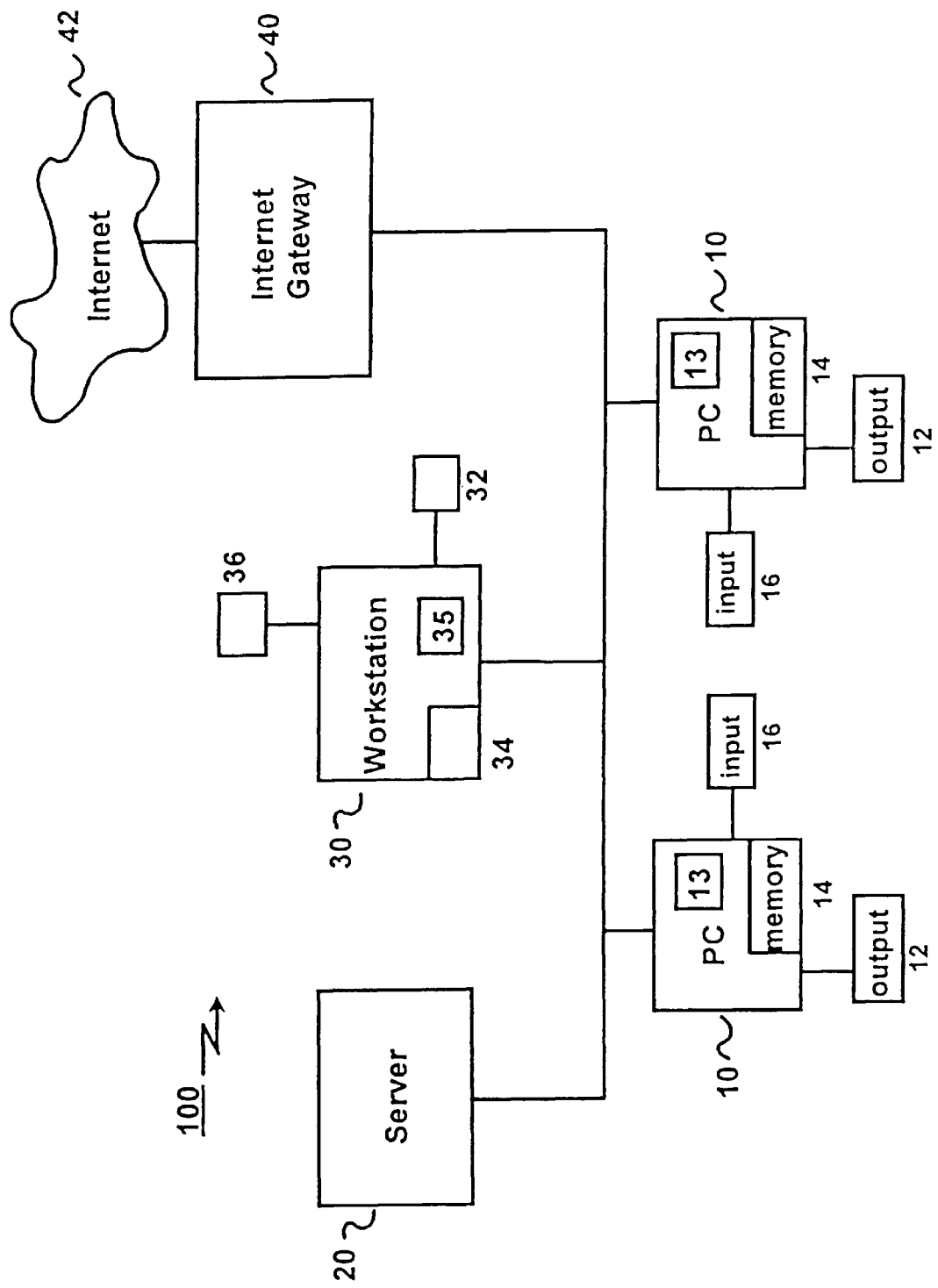
FIG. 1 is a block diagram of a network architecture on which the present invention can operate.

Referring now to the drawings, and initially FIG. 1, there is illustrated a computer network being a local area network (LAN) 100 that is configured to run an agent program 110 of the present invention.

As described herein, the present invention operates on a local area network having a client/server architecture. However, the present invention is not limited to such a network or architecture, and can, for example, easily be adapted to run on, for example, a peer-to-peer network or wide area network. Further, the agent program can be integrated into or created as part of other programs, such as network operating systems, e-mail programs and/or virus detection programs.

The network 100 comprises a server 20, a plurality of personal computers (PC) 10 and workstations 30, and an Internet gateway 40, all of which are coupled together via communication line 15. As stated above, this network configuration is merely illustrative as an example of the type of network architecture that is capable of running the agent of the present invention. The server 20 and the personal computers 10 may be programmed to run a particular e-mail or database programs, such as the Lotus Notes program or the Microsoft Exchange program. Each personal computer typically includes an input device 16 (e.g., keyboard, mouse, etc.), an output device 12 (e.g., a monitor), a processor 13 and a memory 14; likewise, workstation 30 may also include an output device 32, an input device 36, a processor 35 and a memory 34.

Further, gateway 40 provides the network 100 with access to an external computer network, such as, for example, the Internet 42. The agent 110 of the present invention is configured to be compatible with both the e-mail and the database applications that are provided to server 20.

For the purpose of clarity of description, in the example used herein, the agent 110 of the representative embodiment of the present invention is intended to scan attachments to files and messages generated within, sent from or received by the Lotus Notes program. For convenience, the term "e-mail message" will be used to describe all types of files, messages, broadcasts and communications used within, sent from or received by a mail server, such as, for example, the Lotus Notes program, or a database program that allows for attachments. The agent 110 of the present invention can also operate with other network mail and database programs that allow for e-mail message attachments such as, for example, Microsoft's Exchange program, Lotus's cc:mail, and BeyondMail. Additionally, the agent 110 can operate with public folders and public forums (e.g., areas where one user posts a message capable of being viewed by all other users.)

Figure 2:
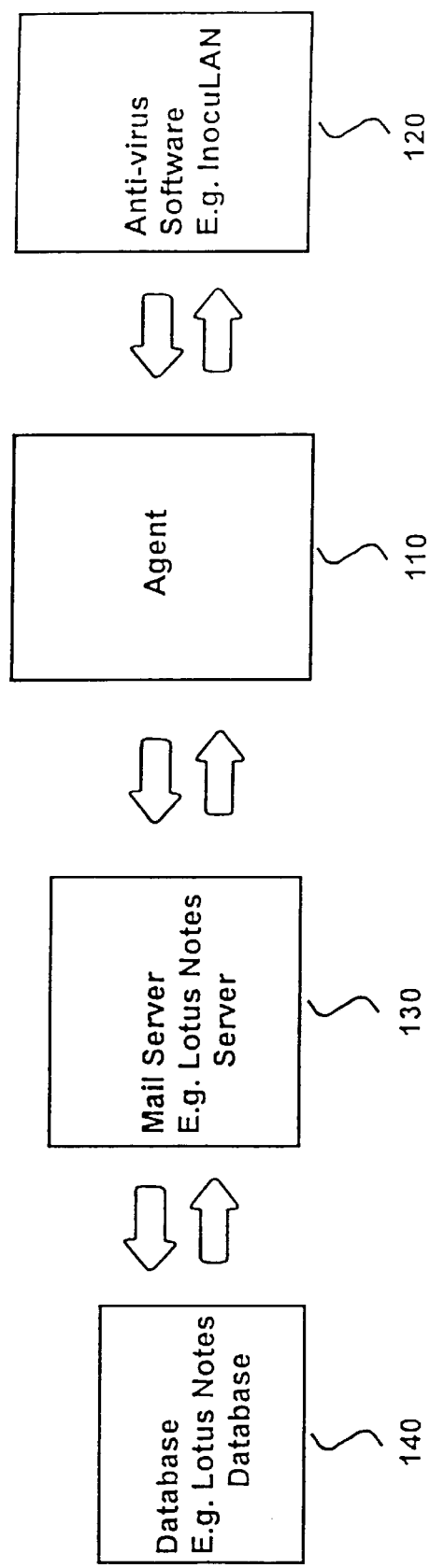
FIG. 2 is a diagram of modular communications between the present invention and an e-mail system.

FIG. 2 illustrates the software components that, in the representative embodiment, are executed by server 20. The representative application executed by the server 20 for the purpose of illustration is the Lotus Notes program. A Lotus Notes server program 130 is configured within server 20 to transmit and receive files and e-mail messages from and to the various other nodes in LAN 100, including Internet gateway 40. One or more databases 140 (herein a Lotus Notes database 140) stores the e-mail messages that have been received, sent, drafted or stored. (In Lotus Notes, every database is treated as a file.) Attachments to the e-mail messages are stored along with such messages in the Lotus Notes database 140. The mail server 130 and the database 140 together can be regarded as a message system. The nodes of the network (e.g., 10, 30) may include client-side mail programs that, interacting with the mail server 130, allow a user to create, read, send, store and edit e-mail messages.

An anti-virus application 120 scans files for viruses and can remove viruses from any infected file. In the representative embodiment, the anti-virus application 120 is the InocuLAN program, available from Cheyenne Software, Inc. of Roslyn Heights, N.Y. The InocuLAN program can be regarded as comprising two submodules, namely a local scanner module and a job service module. The InocuLAN program is used as the user interface for the agent 110, e.g., to set the times when a scan is to take place and to report results of scans.

The agent 110 detaches and forwards any e-mail message attachments to the anti-virus software application 120.

Figure 3:
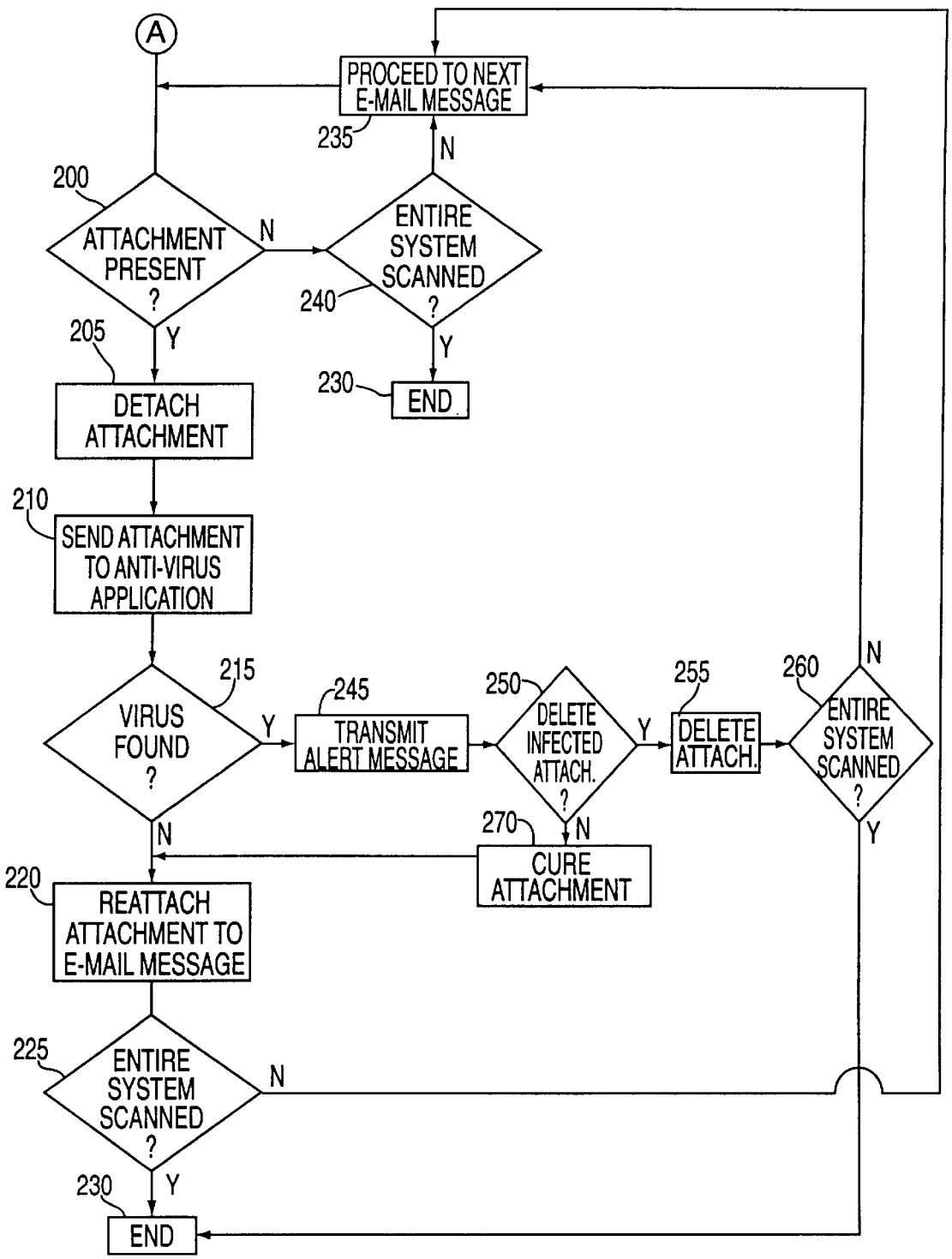
FIG. 3 is a flow chart detailing the operation of the present invention.

FIG. 3 shows a flow diagram corresponding to the operation of the agent 110 of the present invention in conjunction with the anti-virus software application 120. Although the agent 110 of the present invention is generic to both databases and e-mail systems, for the sake of simplicity, the following discussion shall discuss only the scanning of e-mail messages. Further, it is assumed that a complete scan of all e-mail messages (i.e., all attached files for all databases and mail boxes) is to take place. In step 200, the agent 110 determines whether an attachment is present in an e-mail message. If an attachment does not exist, then the Agent 110 determines in step 240 whether the entire mail system 140 has been scanned. If the entire mail system 140 has been scanned, then the agent 110 ceases operation. If, however, the entire mail system 140 has not been scanned, then the agent 110 proceeds to the next e-mail message (step 235). If an attachment is present in an e-mail message, the agent 110 detaches the attachment (step 205), and it sends the attachment to the anti-virus application 120 (step 210). If the anti-virus application 120 does not detect the presence of a virus in the attachment (step 215), then the agent 110 reattaches the attachment to the original e-mail message (step 220).

If, however, the anti-virus application 120 detects the presence of a virus in the attachment, then an alert is generated (step 245). Such an alert may be configured in several ways. For example, the alert may comprise a system-wide text message that is transmitted to every PC 10 or workstation 30 in LAN 100 or to the network administrator, or the alert may instead comprise a message that is delivered to the network node that originated or received the infected attachment. After such an alert is generated, the anti-virus application 120 may (if so configured) delete the infected attachment (step 250). If so, the attachment is deleted (step 255). After step 255, the agent 110 determines if the entire mail system 140 has been scanned (step 260). If so, then the process has reached an end (step 230). If the entire mail system 140 has not been scanned, then the agent 110 proceeds to the next e-mail message (step 235).

If the infected attachment is not to be deleted in step 250, then the anti-virus application 120 cures the infected attachment if possible (step 270). If cured, the attachment is then reattached (step 220), and the agent 110 proceeds to the next e-mail message, if any. The agent 110 is capable of processing e-mail messages that originate within LAN 100 (including Intranet e-mail messages) or that enter LAN 100 from the Internet through gateway 40 (Internet e-mail messages).

The InocuLAN program 120 will alert specified individuals via the e-mail system or via Cheyenne Software, Inc.'s Alert Generic Notification system to warn users so as to stop the virus from spreading. The InocuLAN Local Scanner and Job Service work conjunctively with the agent 110 to perform virus scanning and curing within the message system and to ensure a virus free environment.

The following is a pseudo-code description of a library of APIs that can be used to implement the agent 110 of the present invention. The agent 110 can be regarded as a high level, generic library of APIs. The agent 110 of the representative embodiment can be used in conjunction with both the Lotus Notes and Microsoft Exchange programs. The agent 110 utilizes the Lotus Notes API set, the Microsoft Exchange API set and MAPI to assist in its functions, e.g., to browse, detach and re-attach the e-mail attachment. These Lotus and Microsoft APIs are published, and a skilled programmer will understand how they can be configured to interact with the agent 110. The agent 110 is thus a set of APIs that can be used by an anti-virus application 120 to communicate with a mail server program 130.

In the following pseudo-code, "MDA" is a term that means mail database agent. "UID" is a unique or universal identifier used to identify an e-mail message. This example assumes the LAN is using the Windows NT network operating system.

MDAConnectAgent( ): Establishes a connection to the Messaging Agent. Called before any MDA API calls that require an <agent$_{13}$ id> as an input parameter.

Input

Windows NT server name.

Name of Messaging Agent.

Windows NT login name of user.

The name of the profile used for login (for Exchange Server only).

The password used to login with the above user_id and userProfile.

Output

<agent_id> which is the returned connectionID that can be used by later API calls to trace the current connection instance.

MDADisconnectAgent( ): Disconnect the current connection to the Messaging Agent Called after each MDA session to free the resource.

Input

<agent_id>

MDAGetAgentInfo( ): Get the Messaging system vendor information from the Agent May be called anytime between a MDAConnectAgent( ) and a MDADisconnectAgent( ).

Input
   <agent_id>
   size of buffer pointed to by <vendor>
Output
   <vendor>, which is information about the Messaging system the Agent talked to.

MDAOpenDatabase( ): Open the Lotus Notes database or Exchange Information Store. Called first to get a valid dbhandle. All other MDA API calls that require dbhandle can then be called. MDAScanAllFindFirst( ) or MDAScanDatabaseFindFirst( ) will implicitly open information store.
Input
   <agent_id>
   <dbname> which is the input Lotus Notes database name to be opened; for Microsoft Exchange set to null.
   <istoreUID> which is the UID of the Exchange Information Store to be opened; for Lotus Notes set to null.
Output
   <dbhandle>

MDACloseDatabase( ): Close an opened Lotus Notes Database or Exchange Information Store. Called to release the allocated resource.
Input
   <agent_id>
   <dbhandle>

MDAEnumObjects( ): Enumerate the subobjects within a container. For Exchange and Lotus Notes, there are three layers of objects, namely Agent, Mailbox/Public IStore, and Messages. When <input_object_type> is MDA_OBJECT_AGENT, returns a list of Mailboxes and Public Istores. When <input_object_type> is MDA_OBJECT_MAILBOX or Istore, returns a list of messages within it. May be called anytime between a MDAConnectAgent( ) and a MDADisconnectAgent( ).
Input
   <agent_id>
   <input_object_type>—the type of the input_object to enumerate. Possible values are MDA_OBJECT_AGENT, MDA_OBJECT_MAILBOX and MDA_OBJECT_INFORAMTIONSTORE.
   The display name of the input_object.
   The UID of the input object, for Exchange only.
   The size of the buffer.
Output
   The type of the returned object.
   A buffer containing a list of the display name of the sub_objects, terminated by a double NULL.
   The number of bytes returned in the above buffer.
   A buffer comprising a list of the UID of the sub-objects.
   The number of bytes returned in the above buffer.

MDAGetAllMsgUids( ): Get a list of message UIDs for all the messages in the openedMailbox or Information Store.
Input
   <agent_id>
   <dbhandle>
   The size of the UID buffer.
Output
   A buffer comprising a list of message UIDs of the messages within the Mailbox or Information Store.
   The number of bytes returned in the above buffer.

MDAGetObjectProperty( ): get the desired property of the specified object

MDAScanAllFindFirst( ): Scan the whole message system and return a list of all attachment files stored in the system received after the time stamp specified by <start_time>. If <start_time> is zero, all will be scanned. Will first scan the Public Information Store and then the Private Information Stores. This API will cause a first Information Store to be opened and a dbhandle is to be returned in the AFILE. May be called anytime between a MDAConnectAgent( ) and a MDADisconnectAgent( ), but not within any other active scan sequence. This API call is not made while there is an active dbhandle. A MDACloseFindHandle( ) must be called to terminate a scan session.
Input
   <agent_id>
   <start_time> which is the scan starting time.
Output
   <handle> which is a search handle returned to the caller of the current scan, for the purpose of tracing all the scan sequence.
   <afile> which is the first attachment information found in the system.

MDAScanAllFindNext( ): Get the next attachment information structure of the current scan. Call made within a MDAScan session. This API call may cause an Information Store to be closed and another Information Store to be opened.
Input
   <agent_id>
   <handle>
Output
   <afile> which is the next attachment information found in the system.

MDACloseFindHandle( ): close the current search handle—will terminate the current scan. Called with an active handle. Can be called after a MDAScanAllFindFirst( ), MDAScanAllFindNext( ), MDAScanDatabaseFindFirst( ) or MDAScanDatabaseFindNext( ).
Input
   <agent_id>
   <handle>

MDAScanDatabaseFindFirst( ): scan a specific Information Store and return a list of all the attachment files stored there. May be called anytime between a MDAConnectAgent( ) and a MDADisconnectAgent( ), but not within any other active scan sequence.
Input
   <agent_id>
   <path> which is the path name of the Lotus Notes database to be scanned—used only for Lotus Notes, otherwise set to NULL
   <istoreUID> which is the UID of the Information Store to be scanned—used only for Exchange, otherwise set to NULL.
   <start_time>
Output
   <handle>
   <afile> which is the first attachment found in the store.

MDAScanDatabaseFindNext( ): Get the next attachment information structure of the current scan. This API call made within a MDAScan session. May be called anytime between a MDAConnectAgent( ) and a MDADisconnectAgent( ).

Input
    <agent_id>
    <handle>
Output
    <afile> which is the next attachment found in the system.
    MDADeleteFile( ): Delete the temporary file created for detach the attachment and clear the attachment. If filePath is not NULL, delete the file specified by it. If afile or attachInfo is not NULL then go to the message and remove the attachment from it. May be called anytime between a MDAConnectAgent( ) and a MDADisconnectAgent( ).
Input
    <agent_id>
    <afile> which comprises the attachment information; the dbhandle of current information store is also comprised in it.
    <filePath> which is the path of the temporary file.
    MDAExtractFile( ): Extract the content of the attachment to a temporary file. May be called anytime between a MDAConnectAgent( ) and a MDADisconnectAgent( ).
Input
    <agent_id>
    <afile>
Output
    <filePath>
    MDAAttachFile( ): Attach a file to an existing attachment. May be called anytime between a MDAConnectAgent( ) and a MDADisconnectAgent( ).
Input
    <agent_id>
    <afile>
    <filePath>
    MDAGetMailInfoFromAFile( ): Attach a file to the attachment. May be called anytime between a MDAConnectAgent( ) and a MDADisconnectAgent( ).
Input
    <agent_id>
    <afile>
Output
    <mail> which is information about the message containing the attachment. A bunch of pointers point to the buffer where the actual data resides.
    <buffer> comprising output information.
    The size of the buffer above.
    MDAGetAttFileCountFromMessage( ): Get a list of attachment files of a certain message specified by the messageID. May be called anytime between a MDAConnectAgent( ) and a MDADisconnectAgent( ).
Input
    <agent_id>
    <dbhandle>
    <messageUID> which is the UID of the message.
Output
    A list of attachment file names in that message.
    The size of the above.
    MDASendMail( ): Send mail to a specific user. May be called anytime between a MDAConnectAgent( ) and a MDADisconnectAgent( ).
Input
    <agent_id>
    <dbhandle>
    Message UID
    The mailbox name to open.
    The receiver of the message.
    The sender of the message.
    The message subject.
    The message body.
    MDAGetError( ): Get error information from the agent. May be called anytime between a MDAConnectAgent( ) and a MDADisconnectAgent( ).
    MDAGetMsgTime( ): Get the delivery time stamp of a specific message. May be called anytime between a MDAConnectAgent( ) and a MDADisconnectAgent( ).
Input
    <agent_id>
    <dbhandle>
    <msgUID> used by Exchange to locate the message within the mailbox.
Output
    The timestamp.
    MDAGetOwnerName( ): Get the owner name of a certain attachment file. May be called anytime between a MDAConnectAgent( ) and a MDADisconnectAgent( ).
Input
    <agent_id>
    <afile>
Output
    The name of the owner.
    MDAEstimateAttFiles( ): Estimate the size and number of attachment files with time stamp later than <start_time> in server. May be called anytime between a MDAConnectAgent( ) and a MDADisconnectAgent( ).
Input
    <agent_id>
    <start_time>
Output
    The total number of attachment files.
    The sum of the size of all attachment files.
    MDASetDetachedDir( ): Set a temporary directory to be the detached directory. May be called anytime between a MDAConnectAgent( ) and a MDADisconnectAgent( ).
Input
    <agent_id>
    The detach directory path to be created.
    MDAFreeResource( ): Free the resources allocated for a specific UID. Currently supported for Exchange only.
Input
    <agent_id>
Return
    flags for success and system error.

Scanning of e-mail attachments can take place either on a scheduled basis or a real-time basis. When scanning for viruses is on a scheduled basis, a user, utilizing the anti-virus application 120, specifies the time interval at which scanning should take place, e.g., every 10 minutes, every hour, etc. E-mail received at the mail server program 130 within the previous time interval is scanned. If no new mail is received, no scanning takes place. Thus, when scanning takes place is under the control of the anti-virus application 120.

Real-time scanning will scan an e-mail message each time it is "received" by a user, regardless of whether or not the user is connected to the mail server program 130 and regardless of whether the user reads or accesses the e-mail message. If no mail is received, no scanning takes place.

Thus, no user log-on to a PC 10 or workstation 30 is necessary to trigger the operation of the agent 110 of the present invention.

In the representative embodiment of the present invention, the real-time scanning capability is implemented and described below for Microsoft's Exchange Server program. It provides the real-time scanning capability for Exchange Server. That is, once an e-mail message is forwarded to a mailbox, the agent 110 is immediately invoked. The agent 110 will then detach the attached files if any, and send these files to anti-virus application 120 for scanning. If a virus is detected, the anti-virus application 120 can cure the virus and call the agent 110 to reattach the affected files.

The real-time APIs (described below) include a "call-back" capability. The anti-virus application 120 provides a call-back function to the agent 110. When the agent 110 finds something that is of interest to the anti-virus application 120 (in this case, an e-mail message with an attachment) the agent 110 notifies the anti-virus application 120: in the representative embodiment, the agent detaches the attachment and provides the file name of the attachment to the anti-virus application 120 to enabling scanning of the attachment.

The following pseudo-code describes the APIs for the real-time operation of the present invention in relation to Microsoft's Exchange program:

Functions
    RTConnectAgent( );
    RTDisconnectAgent( );
    RTGetError( );
    RTSetDetachedDir( );
    RTSetCallbackFunction( );
    RTStartupNotification( );
    RTShutdownNotification( );
    RTSetExcludeFileExtension( );
    RTConnectAgent( ) Establish a connection to the Real-time Messaging Agent. Called before any MDA API calls that require an <agent_id> as an input parameter.
Input
    <server_name>
        Windows NT server name.
    <agent_name>
        Name of the Messaging Agent.
    <user_id>
        The Windows NT login name of the user.
    <userProfile>
        The name of the profile used for login.
    <password>
        The pass word used to login with the above user_id and userProfile.
Output
    <agent_id>
        The returned connectionID can be used by later API calls to trace the current connection instance.
    RTDisconnectAgent( ): Disconnect the current connection to the Messaging Agent. Called after each MDA session to free the resource.
Input
    <agent_id>
        ConnectionID of the current connection.
    RTSetExcludeFileExtension( ): Set the address of the inocuLan call back function.
Input
    <agentID>
        ConnectionID of the current connection.
    <excludeFlag>
        Allfiles |all exclude| list only.
    <extCount>
        count of the extension in extString
    <extString>
        A list of extension string.
    RTSetCallbackFunction( ): Set the address of the inocuLan call back function.
Input
    <agentID>
        ConnectionID of the current connection.
    <cbFunction>
        The address of the callback function.
    RTStartupNotification( ): Startup the real-time notification.
Input
    <agentID>
        ConnectionID of the current connection.
    RTShutdownNotification( ): Shutdown the real-time notification.
Input
    <agentID>
        ConnectionID of the current connection.
    RTGetError( ): Get error information from the agent.
Input
    <agent_id>
        ConnectionID of the current connected Agent.
    <errcode>
        The error return code from the agent.
Output
    <err_buff>
        A buffer containing error information.
    <buffer_size>
    RTSetDetachedDir( ): Set a temporary directory to be the detached directory.
Input
    <agent_id>
ConnectionID of the current connected Agent.
    <detached_dir>
        The detach directory path to be created.

Of course, the above real-time scanning capability can be implemented for mail servers other than the Microsoft Exchange server. For example, for the Lotus Notes database, where every database is a file, that file must be opened whenever a new message is placed in the file. Thus, taking advantage of operating system level hooks, the agent 110 can notify the anti-virus application 120 when a new e-mail message is received.

It will be appreciated that the present invention is the first server-based anti-virus agent built using Windows NT WIN32 APIs, Lotus Notes APIs, Microsoft Exchange APIs and MAPI. The client side is transparent to the existence of such anti-virus entities.

Further, the agent 110 of the present invention is a generic agent which can interface with any anti-virus server programs.

The agent 110 of the representative embodiment of the present invention can be implemented utilizing a logic circuit or a computer memory (e.g., a memory device at server 20) comprising computer-readable instructions, such as a computer program. The functionality of the logic circuit or computer memory is described above. The computer program may be stored, for example, on a hard disk, CD-ROM or floppy disk.

What is claimed is:

1. For use in a computer network having a client-server architecture and a message system, a server-based method for detecting and removing computer viruses located in attachments to e-mail messages comprising the steps of:
   providing a scan time period;
   at the server, searching the message system to obtain a list of attachments to e-mail messages received at the message system within the previous scan time period;
   at the server, passing each attachment in the list of attachments to an anti-virus detection module for computer virus scanning;
   at the anti-virus detection module, detecting and removing computer viruses in each attachment in the list of attachments; and
   at the server, re-attaching each attachment to the e-mail messages.

2. The method of claim 1 further comprising the step of repeating the method each scan time period.

3. The method of claim 1 wherein the e-mail messages comprises e-mail messages received from users at workstations on the client-server network on which the message system is located.

4. The method of claim 3 wherein the e-mail messages comprise e-mail messages received from external message systems.

5. The method of claim 1 wherein the e-mail messages comprise e-mail messages received over the Internet.

6. For use in a client-server computer network having a mail server, a method for detecting and removing computer viruses located in attachments to e-mail messages comprising the steps of:
   A. setting a scan time period;
   B. at the server, searching the mail server to obtain a list of attachments to e-mail messages input to the mail server within the previous scan time period;
   C. at the server, detecting and removing computer viruses in each attachment in the list of attachments; and
   D. at the server, re-attaching each attachment to the e-mail messages in the mail server.

7. The method of claim 6 further comprising the step of repeating steps B. through D. each scan time period.

8. The method of claim 6 wherein step C. further comprises the step of passing each attachment in the list of attachments to an anti-virus detection module for computer virus scanning.

9. For use in a client-server computer network having a mail server, a method for detecting and removing computer viruses located in attachments to e-mail messages comprising the steps of:
   A. obtaining a scan time period;
   B. searching the mail server to create a list of attachments to e-mail messages that were input to the mail server within the previous scan time period;
   C. passing each attachment in the list of attachments to an anti-virus detection module for computer virus scanning and removal;
   D. re-attaching each attachment to the e-mail messages in the mail server after scanning and removal of computer viruses at the anti-virus detection module; and
   E. repeating steps B. through D. each scan time period.

10. For use in a client-server computer network having a plurality of workstations and a server, the server including a message system, a server-based method for detecting and removing computer viruses located in attachments to e-mail messages, comprising the steps of:
    receiving an e-mail message at the message system;
    upon receipt of the e-mail message, determining whether the e-mail message includes an attachment;
    if the e-mail message includes an attachment, passing the attachment to an anti-virus detection module for computer virus scanning;
    at the anti-virus detection module, detecting and removing computer viruses in the attachment; and
    re-attaching each attachment to the e-mail messages.

11. The method of claim 10 wherein the step of receiving an e-mail message comprises the step of receiving an e-mail message from an external computer network.

12. The method of claim 10 wherein the step of receiving an e-mail message comprises the step of receiving an e-mail message from a workstation.

13. In a first computer network having a plurality of nodes, the first computer network configured to operate an e-mail system for sending and receiving among the plurality of nodes a plurality of e-mail messages, a sub-set of the plurality of e-mail messages having at least one attachment associated therewith, a method for detecting and removing computer viruses from the attachments to the plurality of e-mail messages, the method comprising the steps of:
    detaching the at least one attachment from each of the sub-set of the plurality of e-mail messages;
    sending the at least one attachment to an anti-virus application;
    scanning the at least one attachment for the at least one computer virus in accordance with the anti-virus application;
    removing the at least one computer virus from the at least one attachment; and
    reattaching the at least one attachment to a corresponding one of the plurality of e-mail messages.

14. The method according to claim 13, wherein at least one of the plurality of e-mail messages originates from a second computer network in communication with the first computer network.

15. The method according to claim 13, wherein at least one of the plurality of e-mail messages originates from the first computer network.

16. The method according to claim 13, wherein the attachments are scanned regardless of whether opened or viewed by a user.

17. The method according to claim 13, wherein the attachments are scanned without user intervention.

18. The method according to claim 17, wherein at least one of the plurality of e-mail messages originates from a second computer network in communication with the first computer network.

19. In a first computer network having a plurality of nodes, the first computer network configured to operate an e-mail system for sending and receiving a plurality of e-mail messages among the plurality of nodes, a subset of the plurality of e-mail messages having at least one attachment associated therewith, a method for detecting and removing at least one computer virus from the at least one attachment, the method comprising the steps of:
    detaching the at least one attachment from each of the plurality of e-mail messages;
    determining whether the at least one attachment is infected with the at least one computer virus;
    removing the at least one computer virus from the at least one attachment; and
    reattaching the at least one attachment to a corresponding one of the plurality of e-mail messages.

20. A system for detecting computer viruses located in attachments to e-mail messages in a client-server computer network including a server computer and a plurality of client computers and a message system located at the server computer for controlling the distribution of e-mail messages, comprising:

an anti-virus module located at the server computer for scanning files for viruses; and an agent located at the server computer, the agent providing an interface between the anti-virus module and the message system, and including means for receiving a scan time period, means for searching the message system to obtain a list of attachments to e-mail messages received at the message system within the previous scan time period, means for passing each attachment in the list of attachments to the anti-virus module for computer virus scanning, and means for re-attaching each attachment to the e-mail messages.

21. The system of claim 20 wherein the e-mail messages comprises e-mail messages received from client computers on the computer network.

22. The system of claim 20 wherein the message system comprises an external gateway and the e-mail messages comprise e-mail messages received from external message systems.

23. The system of claim 20 wherein the e-mail messages comprise e-mail messages received over an Internet connection.

24. An anti-virus agent for use in a client-server computer network having a server computer including a mail server with e-mail messages and a plurality of client computers, the anti-virus agent assisting in the detection of computer viruses located in attachments to e-mail messages, comprising:

means for setting a scan time period;

means, located at the server computer, for searching the mail server to obtain a list of attachments to e-mail messages input to the mail server within the previous scan time period;

means for passing each attachment in the list of attachments to an anti-virus detection module for computer virus scanning and removal; and means, located at the server computer, for re-attaching each attachment to the e-mail messages in the mail server.

25. The system of claim 24 further comprising means for detecting and removing computer viruses in each attachment in the list of attachments.

26. In a first computer network having a plurality of nodes and configured to operate an e-mail system for sending and receiving among the plurality of nodes a plurality of e-mail messages, a sub-set of the plurality of e-mail messages having at least one attachment associated therewith, a system for detecting and removing computer viruses from the attachments to the plurality of e-mail messages, the system comprising:

means for detaching the at least one attachment from each of the sub-set of the plurality of e-mail messages;

means for sending the at least one attachment to an anti-virus application;

means for scanning the at least one attachment for the at least one computer virus in accordance with the anti-virus application;

means for removing the at least one computer virus from the at least one attachment; and means for reattaching the at least one attachment to a corresponding one of the plurality of e-mail messages.

27. The system of claim 26, wherein at least one of the plurality of e-mail messages originates from a second computer network in communication with the first computer network.

28. The system of claim 26, wherein at least one of the plurality of e-mail messages originates from within the first computer network.

29. In a first computer network having a plurality of nodes and configured to operate an e-mail system for sending and receiving a plurality of e-mail messages among the plurality of nodes, a subset of the plurality of e-mail messages having at least one attachment associated therewith, a system for detecting and removing at least one computer virus from the at least one attachment, the system comprising:

means for detaching the at least one attachment from each of the plurality of e-mail messages;

means for determining whether the at least one attachment is infected with the at least one computer virus;

means for removing the at least one computer virus from the at least one attachment; and means for reattaching the at least one attachment to a corresponding one of the plurality of e-mail messages.

30. A real-time system for detecting computer viruses located in attachments to e-mail messages in a client-server computer network including a server computer and a plurality of client computers, a message system being located at the server computer for controlling the distribution of e-mail messages and including a plurality of mailboxes, the real-time system comprising:

an anti-virus module located at the server computer for scanning files for viruses; and an agent located at the server computer, the agent providing an interface between the anti-virus module and the message system and invoked whenever an e-mail message is forwarded to a mailbox, and including means for determining if an e-mail message includes an attachment, means for detaching the attachment from the e-mail message, means for enabling the anti-virus module to scan the attachment for computer viruses, and means for re-attaching each attachment to the e-mail messages.

31. The real-time system of claim 30 wherein the means for detaching further comprises means for storing the attachment in a file.

32. The real-time system of claim 31 wherein the means for enabling further comprises means for notifying the anti-virus module of the address of the file in which the attachment is stored.

33. The real-time system of claim 30 wherein the e-mail messages comprises e-mail messages received from client computers on the computer network.

34. The real-time system of claim 30 wherein the agent provides an interface between the message system and a plurality of different anti-virus modules.

35. The real-time system of claim 30 wherein the agent provides an interface between the anti-virus module and a plurality of different message systems.

\* \* \* \* \*